United States Patent
Shibata et al.

(10) Patent No.: US 11,014,019 B2
(45) Date of Patent: May 25, 2021

(54) STATIONARY PHASE FOR SUPERCRITICAL FLUID CHROMATOGRAPHY

(71) Applicant: DAICEL CORPORATION, Osaka (JP)

(72) Inventors: Toru Shibata, Himeji (JP); Satoshi Shinkura, Himeji (JP)

(73) Assignee: DAICEL CORPORATION, Osaka (JP)

( * ) Notice: Subject to any disclaimer, the term of this patent is extended or adjusted under 35 U.S.C. 154(b) by 258 days.

(21) Appl. No.: 15/748,958

(22) PCT Filed: Jul. 29, 2016

(86) PCT No.: PCT/JP2016/072430
§ 371 (c)(1),
(2) Date: Jan. 30, 2018

(87) PCT Pub. No.: WO2017/022695
PCT Pub. Date: Feb. 9, 2017

(65) Prior Publication Data
US 2019/0001238 A1    Jan. 3, 2019

(30) Foreign Application Priority Data
Jul. 31, 2015    (JP) .............................. JP2015-152168

(51) Int. Cl.
| | | |
|---|---|---|
| *B01D 15/40* | (2006.01) | |
| *B01J 20/286* | (2006.01) | |
| *B01J 20/281* | (2006.01) | |
| *B01J 20/30* | (2006.01) | |
| *G01N 30/02* | (2006.01) | |
| *C08F 292/00* | (2006.01) | |

(Continued)

(52) U.S. Cl.
CPC ............ *B01D 15/40* (2013.01); *B01J 20/281* (2013.01); *B01J 20/286* (2013.01); *B01J 20/30* (2013.01); *B01J 20/3204* (2013.01); *B01J 20/3217* (2013.01); *C08F 292/00* (2013.01); *G01N 30/02* (2013.01); *G01N 30/88* (2013.01)

(58) Field of Classification Search
None
See application file for complete search history.

(56) References Cited

U.S. PATENT DOCUMENTS

| | | |
|---|---|---|
| 5,035,803 A | 7/1991 | Cohen |
| 5,792,331 A | 8/1998 | Srinivasan et al. |

(Continued)

FOREIGN PATENT DOCUMENTS

| | | |
|---|---|---|
| EP | 1867666 A1 | 12/2007 |
| JP | 2001 506364 A | 5/2001 |

(Continued)

OTHER PUBLICATIONS

International Search Report for PCT/JP2016/072430 dated Nov. 1, 2016.

(Continued)

*Primary Examiner* — Kara M Peo
(74) *Attorney, Agent, or Firm* — Birch, Stewart, Kolasch & Birch, LLP

(57) ABSTRACT

Provided is a stationary phase for supercritical fluid chromatography that includes a carrier on which is supported a polymer that includes a pyrrolidone backbone in the repeating units of the main chain.

5 Claims, 6 Drawing Sheets

(51) Int. Cl.
  *G01N 30/88* (2006.01)
  *B01J 20/32* (2006.01)

(56) References Cited

U.S. PATENT DOCUMENTS

| | | |
|---|---|---|
| 2005/0209100 A1 | 9/2005 | Duval et al. |
| 2013/0072593 A1 | 3/2013 | Huang et al. |
| 2013/0112605 A1 | 5/2013 | Wyndham et al. |
| 2013/0331264 A1 | 12/2013 | Yamada et al. |
| 2015/0133618 A1 | 5/2015 | Hanssen et al. |
| 2015/0182943 A1 | 7/2015 | Shibata et al. |
| 2016/0184736 A1 | 6/2016 | Wyndham et al. |

FOREIGN PATENT DOCUMENTS

| | | |
|---|---|---|
| JP | 2003-337125 A | 11/2003 |
| JP | 2012-162518 A | 8/2012 |
| JP | 2013-539016 A | 10/2013 |
| JP | 2015-515633 A | 5/2015 |
| WO | WO 03/055594 A2 | 7/2003 |
| WO | WO 2014/017280 A1 | 1/2014 |
| WO | WO 2014/034442 A1 | 3/2014 |
| WO | WO 2014/201033 A1 | 12/2014 |

OTHER PUBLICATIONS

Köhler, "Poly(vinylpyrrolidone)-coated Silica: A Versatile, Polar Stationary Phase for HPLC", Chromatographia, Oct. 1986, vol. 21, No. 10, pp. 573-582.

Kou et al., "Reversed phase and normal phase liquid chromatography on poly(1-vinyl-2-pyrrolidone) or poly(1-vinylimidazole) bonded silica using γ-methacryloxypropyltrimethoxysilane as coupling agent. Stationary phases 23", Fresenius J Anal Chem, 1990, vol. 336, pp. 409-414.

Krasilnikov et al., "Adsorption and Chromatographic Properties of Modified Silica Sorbents for the Production of Viral Preparations", Journal of Chromatography, 1988, vol. 446, pp. 211-219.

West et al., "Orthogonal screening system of columns for supercritical fluid chromatography", Journal of Chromatography A, 2008, vol. 1203, pp. 105-113.

Written Opinion of the International Searching Authority for PCT/JP2016/072430 (PCT/ISA/237) dated Nov. 1, 2016.

Extended European Search Report, dated Jul. 6, 2018, for corresponding European Application No. 16832974.6.

Notification of Transmittal of Copies of Translation of the International Preliminary Report on Patentability for PCT/JP2016/072430 (Forms PCT/IB/338 and PCT/IB/373 dated Feb. 15, 2018).

Written Opinion of the International Search Authority for PCT/JP2016/072430 (Form PCT/ISA/237) dated Nov. 1, 2016.

STATIONARY PHASE FOR SUPERCRITICAL FLUID CHROMATOGRAPHY

TECHNICAL FIELD

The present invention relates to chromatographic techniques. More particularly, the present invention relates to a stationary phase that is utilized in supercritical fluid chromatography.

BACKGROUND ART

Chromatography is the most effective means among methods for analysis of the components of a mixture and the contents of the components, and for separation and purification of the components. In chromatography different substances are separated by utilizing the substance-specific distribution ratio (also understood as the adsorption equilibrium) between a porous solid (stationary phase) spatially immobilized in a column or a tube, known as a capillary, and a fluid (mobile phase) that moves through the voids in the porous solid. Gas chromatography and liquid chromatography are typical here. A gas is used as the mobile phase in the former.

In order for a separation target to move mixed in a gas phase, however, a certain vapor pressure must exist, and as a consequence only a relatively limited range of analytes, i.e. of low molecular weight and having no charge, can be utilized. Liquid chromatography, by contrast, uses a liquid as the mobile phase and can be applied to most substances, so long as a suitable mobile phase is selected. On the other hand, liquids generally have high viscosities, and hence limits are imposed by a rise in viscous resistance when good separation is to be secured using a long column or capillary.

Supercritical fluid chromatography (SFC) was invented as a technology that can overcome the shortcomings of both gas chromatography and liquid chromatography. Supercritical fluid chromatography exploits the characteristics of a supercritical or subcritical fluid, i.e. dissolving other compounds much better than a gas, and having a lower viscosity and a higher diffusion rate than a liquid. Herein SFC using carbon dioxide as the supercritical fluid is generally used to in terms of safety and from the viewpoint of equipment considerations, and its use is gradually becoming more widespread. Besides SFC there is also chromatography that uses electrical attraction and so-called thin-layer chromatography (a variant of liquid chromatography), in which paper or a powder is consolidated in a thin layer, but the scope of application of the foregoing is not very broad.

Typical modes for liquid chromatography are normal-phase chromatography, which uses a combination of a high-polarity stationary phase and a low-polarity mobile phase, and reversed-phase chromatography, in which these polarities are reversed. Attention has been given recently to HILIC, in which both phases are polar. In addition, chromatographic techniques based on specific interactions are also known, such as ligand exchange chromatography, which relies on metal ion/ligand interactions, and affinity chromatography, which utilizes biochemical interactions. The characteristics and separation mechanisms involved are generally understood, and their technical advances mainly concern improvements in particle shape for improving separation efficiency.

In contrast, the characteristics of supercritical fluid chromatography (SFC) are reported to be similar to those of normal-phase chromatography. However, many aspects pertaining to characteristics and mechanisms are still not well understood, and there is also a line of thinking that envisages covering separation targets of wide polarity change through a gradual shift to reversed phase systems.

Stationary phases used in SFC are silica gel or silica gel having had the surface thereof modified with various atomic groups, for instance as disclosed in Non-patent document 1.

The modifying group may contain a saturated alkyl chain of various chain lengths, or may be a modifying group to which a one or two benzene rings or a condensed polycyclic aromatic hydrocarbon group are bonded via an alkyl chain or an alkyl chain that includes an amide bond or an ether bond, or a modifying group the characterizing feature of which is a halogen-substituted benzene ring, or a modifying group having a halogenated alkyl group bonded thereto, or a modifying group having bonded thereto a polar group such as a 2,3-dihydroxypropyl group, a CN group, or a $NH_2$ group, and may be a polymeric modifying group such as crosslinked polystyrene, polyvinyl alcohol or polyethylene glycol. Carbon having a graphite structure is also a characteristic stationary phase. Among the foregoing, in particular (2-pyridyl)ethyl group-bonded stationary phases, referred to as 2-ethylpyridine, are frequently used in SFC. These stationary phases are preferably used since not only do they afford elution with sharp peaks, even for basic compounds that undergo tailing and exhibit broad peaks in ordinary stationary phases, but are also capable of suitably retaining acidic compounds as well.

As pointed out in Non-patent document 2, however, there are also not a few stationary phases having no differences in characteristics and which exhibit similar retention trends towards various compounds. Such being the case, the inventors have diligently pursued the development of stationary phases that can be used in SFC, acknowledging that the ability to discriminate among molecules having similar structures is a necessary requirement.

Silica gel or silica gel having had the surface thereof modified with various low molecular compounds constitutes herein the majority of stationary phases having been used to date in SFC. However, some cases have also been reported of stationary phases resulting from modifying the silica gel surface with polymers. In Patent Document 1, for instance, a polymer having an aromatic ring and a bipolar atomic group in repeating units of the main chain is used as the stationary phase. This is known to be not only effective for separation of various compounds, but also for bringing out good molecular shape recognition ability. These stationary phases were however problematic in that, unlike the 2-ethylpyridine columns described above, tailing occurred during analysis of basic substances, which resulted in broad peaks.

Further, such stationary phases are prepared by supporting the above polymer on a particulate or monolithic carrier. As a result, when a solvent capable of dissolving the polymer or a mixed solvent containing such a solvent is used as a developing solvent, part or the entirety of the stationary phase is dissolved, which may impair the functionality of the column.

Examples of the use of polyvinylpyrrolidone in chromatographic applications are known in the art.

In some examples, specifically, particles of poly(l-vinyl-2-pyrrolidone) (PVP) having been rendered insoluble through crosslinking are packed into a column, to be used as a chromatographic stationary phase (for instance Non-patent document 2).

Bonding of PVP to the surface of silica gel, which is a hard gel, has also been attempted.

When for example silica gel is used as a stationary phase for separation of proteins or microorganisms, the properties of the target product may change due to so-called denaturation, and yield may drop significantly. Accordingly, attempts have been made to shield against the influence of silica gel through coating of the surface with a hydrophilic polymer, with a view to preventing the above occurrences (Non-patent document 3).

Various PVP bonding methods have also been tried. In one reported case, for instance, silica gel is coated with PVP, followed by a crosslinking treatment with γ-rays (Non-patent document 2). Another report discloses a method that involves bonding a silane coupling agent having a vinyl group or a methacryloxy group to silica gel, and then copolymerizing the silane coupling agent with vinylpyrrolidone monomers (Non-patent document 4). However these methods result generally in broad peaks, and are not very useful in HPLC.

CITATION LIST

Patent Literature

[Patent Document 1] Japanese Patent Application No. 2012-162518

Non-Patent Document

[Non-patent document 1] C. West et al., J. Chromatogr. A, 1203 (2008) 105
[Non-patent document 2] Kohler, Chromatographia, 21 (1986) 573
[Non-patent document 3] I. Krasilnikov et al., J. Chromatogr., 446 (1988) 211
[Non-patent document 4] C. R. Kou et al., Fresenius J. Anal. Chem., 336 (1990) 409

SUMMARY OF INVENTION

Technical Problem

It is an object of the present invention, which solves the above problems, to provide a stationary phase for supercritical fluid chromatography having good molecular discrimination ability.

Solution to Problem

As a result of diligent research aimed at solving the above problems, the inventors found that good molecular discrimination ability can be brought out, in supercritical fluid chromatography, by a stationary phase comprising a carrier and a polymer that includes a pyrrolidone backbone in repeating units of the main chain of the polymer, and the polymer being supported on the carrier, and perfected the present invention on the basis of that finding.

Specifically, the present invention is as follows.

[1] A stationary phase for supercritical fluid chromatography, comprising a carrier and a polymer including a pyrrolidone backbone in repeating units of a main chain of the polymer, the polymer being supported on the carrier.

[2] The stationary phase for supercritical fluid chromatography of [1], having a structure represented by Formula (II):

[C1]

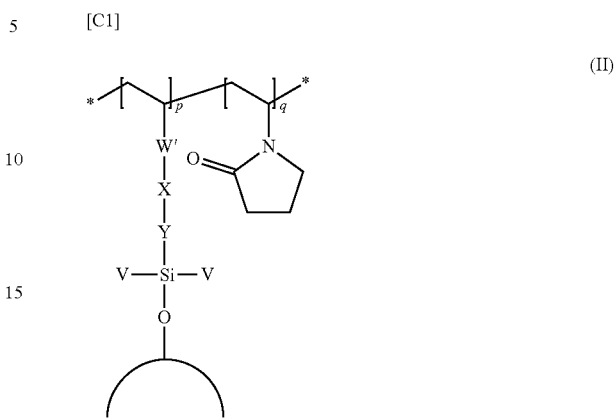

(In Formula II, W' is a single bond or a branched or non-branched alkylene group having carbon number of 1 to 10; X is an amide group, an ester group, a N-alkylamide group having carbon number of 1 to 3, an ether group, a sulfoxide group, a sulfone group, a sulfide group or a phosphate ester group; Y is an alkylene group having carbon number of 1 to 30; V is an ether group bonded to a carrier surface, an alkoxy group having carbon number of 1 to 5 or an alkyl group having carbon number of 1 to 3; p is 1 to 10; and q is 10 to 300.)

[3] The stationary phase for supercritical fluid chromatography of [1] or [2], which is a spherical particle.
[4] The stationary phase for supercritical fluid chromatography of any one of [1] to [3], wherein an average particle size is 0.1 μm to 1000 μm.
[5] The stationary phase for supercritical fluid chromatography of any one of [1] to [3], which is of monolithic form.
[6] A method for separating a target substance, the method including a step of separating the target substance by using the stationary phase of any one of [1] to [5], and a mobile phase containing a supercritical fluid.
[7] A method for producing a stationary phase for supercritical fluid chromatography, the method including a step of copolymerization between 1-vinyl-2-pyrrolidone and a carrier having a polymerizable functional group bonded thereto.
[8] The method for producing a stationary phase for supercritical fluid chromatography of [7], wherein the polymerizable functional group is a vinyl group, an allyl group, an isopropenyl group or a alkenyl group having carbon number of 4 to 12 and a double bond at the ω position.
[9] The method for producing a stationary phase for supercritical fluid chromatography of [7] or [8], wherein the carrier having a polymerizable functional group bonded thereto is surface-modified silica gel obtained through silane coupling of a compound represented by Formula (I) and silica gel:

[C2]

$$W\text{---}X\text{---}Y\text{---}SiR_{3-n}Z_n \qquad (I)$$

(In Formula (I), W is a vinyl group, an allyl group, an isopropenyl group or an alkenyl group having carbon number of 4 to 12 and a double bond at the ω position; X is an amide group, an ester group, a N-alkylamide group having carbon number of 1 to 3, an ether group, a sulfoxide group, a sulfone group, a sulfide group or a phosphate ester group; Y is an alkylene group having carbon number of 1 to 30; Z is a alkylene group having carbon number of 1 to 30; R is each independently an alkyl group having carbon number of 1 to 5; Z is a leaving group capable of creating a bond between the silicon atom of Formula (I) and the carrier; and n is an integer from 1 to 3.)

[10] The method for producing a stationary phase for supercritical fluid chromatography of [9], wherein W is a vinyl group; X is an amide group or a N-alkylamide group having carbon number of 1 to 3; Y is an alkylene group having carbon number of 1 to 5; R is each independently a methyl group, an ethyl group or a propyl group; and Z is an alkoxy group having carbon number of 1 to 5, a halogen, an alkylmercaptyl group having carbon number of 1 to 20, a dimethylamino group, a diethylamino group, a pyrrolidino group, an imidazolyl group, an allyl group or a 2-methyl-2-propenyl group.

[11] A method for producing a stationary phase for supercritical fluid chromatography, the method including: a step of obtaining a polymer through radical polymerization of 1-vinyl-2-pyrrolidone, in the presence of a chain transfer agent having a reactive silyl group at one end; and a step of silane coupling for the obtained polymer, on a carrier surface.

[12] The method for producing a stationary phase for supercritical fluid chromatography of [11], wherein the chain transfer agent having a reactive silyl group at one end is a compound represented by Formula (III).

[C3]

$$R_{3-n}Z_nSi-Y-T \quad \quad (III)$$

(In Formula (III), R is each independently an alkyl group having carbon number of 1 to 5; Z is a leaving group capable of creating a bond between the silicon atom of Formula (III) and the carrier; Y is an alkylene group having carbon number of 1 to 30; T is a chain transfer functional group; and n is an integer from 1 to 3.)

Effects of Invention

The present invention allows providing a stationary phase for supercritical fluid chromatography having good molecular discrimination ability.

DESCRIPTION OF EMBODIMENTS

Figure 1A:
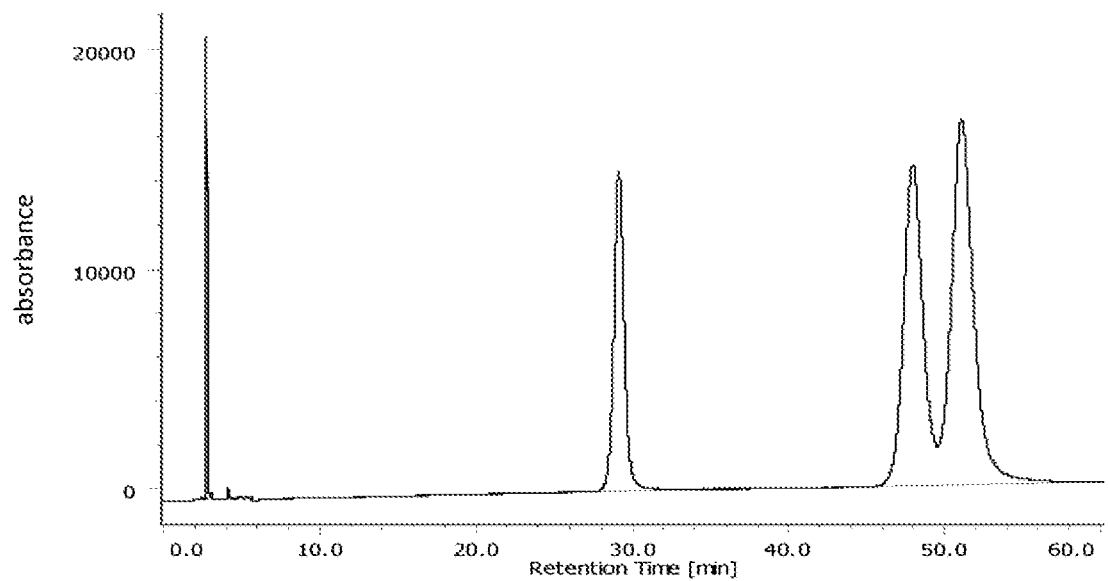
FIG. 1A is a diagram illustrating results obtained by HPLC.

The stationary phase for supercritical fluid chromatography of the present invention contains a carrier having supported thereon a polymer that includes a pyrrolidone backbone in repeating units of the main chain.

In the present invention the stationary phase denotes a material that is fixed in the interior of an analytical instrument (column or capillary), such that a substance to be separated is isolated by being distributed between the material and a fluid that moves while in contact with the material. In a case where the stationary phase is in the form of particles, the term stationary phase may denote aggregates formed through packing of the particles, as well as the individual particles of the aggregates.

The feature of having a pyrrolidone backbone in repeating units of the main chain denotes herein a feature wherein a 2-pyrrolidone backbone represented by the formula below is bonded to the main chain of polymer molecules. In the present invention the proportion of units derived from 1-vinyl-2-pyrrolidone in the polymer molecules is preferably 80 mol % or higher, from the viewpoint of securing performance as a stationary phase.

[C4]

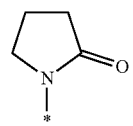

(The asterisk in the formula denotes the position of bonding to the main chain of the polymer.)

In the stationary phase of the present invention a polymer is supported on a carrier, from the viewpoint of stability and separation performance of the stationary phase. More preferably, chemical bonds are formed between the polymer and the carrier. For instance the production methods below may be illustrated as specific examples.

Among the production methods below, chemical bonds (covalent bonds) are generated between the polymer and the carrier in production methods (1) to (7). In the production methods (8) and (9), by contrast, polymers are crosslinked on the surface of the carrier, and as a result the polymer does not elute from the carrier surface.

The polymer in the stationary phase for supercritical fluid chromatography can be applied by relying on physical bonding to the carrier, but this is not found to be a preferred method, since in that case the polymer is eluted by solvents.

(1) A method including a step of radical copolymerization between 1-vinyl-2-pyrrolidone and a carrier having a polymerizable functional group bonded thereto.

(2) A method including a step of obtaining a polymer through radical polymerization of 1-vinyl-2-pyrrolidone, in the presence of a chain transfer agent having a reactive silyl group at one end, and a step of silane coupling for the obtained polymer, on the carrier surface.

(3) A method including a step of introducing a covalent bond, for yielding a dormant species, on the carrier surface, and causing living radical polymerization from the carrier surface using 1-vinyl-2-pyrrolidone, to thereby introduce a polymer containing a 2-pyrrolidone backbone in repeating units of the main chain, on the carrier surface.

(4) A method including a step of copolymerizing a silane coupling agent having a polymerizable double bond and 1-vinyl-2-pyrrolidone, and a step of silane coupling for the obtained polymer, on the carrier surface.

(5) A method including a step of introducing a chain transfer functional group on a carrier surface, and causing radical polymerization of 1-vinyl-2-pyrrolidone.

(6) A method including a step of obtaining a polymer through anionic polymerization of 1-vinyl-2-pyrrolidone and an anionic initiator having a reactive silyl group at the starting end, and a step of silane coupling for the obtained polymer, on the carrier surface.

(7) A method including a step in which a polymer is obtained by anionic polymerization of an anionic initiator and 1-vinyl-2-pyrrolidone, followed by terminating agent containing a silane coupling agent, and a step of silane coupling for the obtained polymer, on the carrier surface.

(8) A method including a step of mixing a carrier with a composition that contains 1-vinyl-2-pyrrolidone, a crosslinking agent and an initiator, and causing a crosslinking reaction.

(9) A method including a step of coating the surface of a carrier with poly(vinylpyrrolidone) having been obtained through polymerization of 1-vinyl-2-pyrrolidone, and causing a crosslinking reaction through irradiation of γ-rays or electron beams.

In all these methods the tacticity of the generated polymer can be controlled through adjustment of the polymerization temperature, polymerization solvent, additives and the like, at the time of polymerization.

Production method (1) will be explained.

The carrier, to which the polymerizable functional group is bonded, that is utilized in production method (1) of the stationary phase of the present invention, can be produced in accordance with the method below.

Examples of the polymerizable functional group that is bonded to the carrier includes radical polymerizable functional groups. Examples thereof include for instance vinyl groups, allyl groups, isopropenyl groups and an alkenyl groups having Carbon number of 4 to 12 and having a double bond at the ω position. Preferred among the foregoing are vinyl groups, allyl groups and isopropenyl groups.

The carrier may be a porous organic carrier or a porous inorganic carrier, but may be preferably a porous inorganic carrier. Appropriate porous organic carriers include for instance polymer substances selected from among polystyrene, poly(meth)acrylamide, poly(meth)acrylate and the like, while appropriate porous inorganic carriers include for instance silica gel, alumina, zirconia, titania, magnesia, glass, kaolin, titanium oxide, silicates, hydroxyapatite and the like. Preferred carriers are herein silica gel, alumina and glass.

In a case where silica gel is used as the carrier, the above polymerizable functional group is chemically bonded to the carrier via the silanol groups of the silica gel.

If a carrier other than silica gel is used, a surface treatment to the carrier makes it possible to suppress excessive adsorption, to the carrier itself, of the substance to be separated. Further, a surface treatment to the carrier allows the carrier to be bonded to the polymerizable functional group via groups introduced in the surface treatment. Examples of surface treatment agents include for instance silane coupling agents such as aminopropylsilane, as well as titanate- and aluminate-based coupling agents.

The carrier to which a polymerizable functional group such as those above is to be bonded is obtained for instance through silane coupling of the compound represented by Formula (I) below and silica gel.

[C5]

$$W\text{—}X\text{—}Y\text{—}SiR_{3-n}Z_n \qquad (I)$$

(In Formula (I), W is a vinyl group, an allyl group, an isopropenyl group or an alkenyl group having carbon number of 4 to 12 and having a double bond at the ω position; X is an amide group, an ester group, a N-alkylamide group having carbon number of 1 to 3, an ether group, a sulfoxide group, a sulfone group, a sulfide group or a phosphate ester group; Y is an alkylene group having carbon number of 1 to 30; R is each independently an alkyl group having carbon number of 1 to 3; Z is a leaving group capable of creating a bond between the silicon atom of Formula (I) and the carrier; and n is an integer from 1 to 3.)

In Formula (I), preferably, W is a vinyl group, an allyl group or an isopropenyl group.

In Formula (I), X is part of the linker between W and the Z group at the terminus, and is preferably an amide group, a N-alkylamide group having carbon number of 1 to 3, an ester group or a phenylene group.

In Formula (I), preferably, Y is an alkylene having carbon number of 1 to 5, and more preferably any one of a methylene group, an ethylene group and a trimethylene group.

In Formula (I), preferably, R is a methyl group or an ethyl group.

In a case where X in Formula (I) is an "amide group", X may be embodied as —N—CO—Y or —CO—N—Y. In a case where X is an "N-alkylamide group", X may be embodied as —NR—CO—Y or —CO—NR—Y.

In preferred embodiments, W in Formula (I) above is a vinyl group and X is an amide group or an N-alkylamide group, or alternatively, W is an isopropenyl group and X is an amide group or an N-alkylamide group, from the viewpoint of ease of synthesis.

In preferred embodiments, when X in Formula (I) is an "amide group", X has the structure —CO—NH—, and Y is bonded to nitrogen; while when X is an "N-alkylamide group", X has the structure —CO—NR— (where R is a alkyl group having carbon number of 1 to 3), and Y is bonded to nitrogen.

In Formula (I), Z is a leaving group, and may be any atomic group so long as Z is capable of creating a bond between the silicon atom in Formula (I) and an atom that constitutes the carrier, such as oxygen. In order to improve the balance between handleability and reactivity, the leaving group ordinarily used is an alkoxy group having carbon number of 1 to 5, particularly preferably a methoxy group or ethoxy group. Other examples include halogens (chlorine, bromine or iodine), alkylmercaptyl groups having carbon number of 1 to 20, nitrogen-containing groups such as dimethylamino groups, diethylamino groups, pyrrolidino groups and imidazolyl groups, allyl groups and 2-methyl-2-propenyl groups. The reaction conditions (including catalyst addition) can be adjusted depending on the type of the leaving group.

The compound represented by Formula (I) can be obtained through reaction of a compound having the structure represented by W in Formula (I), and a compound having the structure —Y—$SiR_{3-n}Z_n$ of Formula (I).

The moiety "—X—" in Formula (I) is generated through reaction of these compounds.

Examples of compounds having the structure represented by W include α-alkyl acrylic acids in which the hydrogen bonded to the 1-position of a vinyl group is unsubstituted or substituted with an alkyl group having carbon number of 1 to 12, and halides of α-alkyl acrylic acids in which the hydrogen bonded to the 1-position of the vinyl group is unsubstituted or substituted with an alkyl group having carbon number of 1 to 12.

Examples of compounds having the structure —Y—$SiR_{3-n}Z_n$ in Formula (I) include for instance silane coupling agents having a group being the precursor of X explained above, and having an alkoxy group having carbon number of 1 to 5 as a leaving group. Specific examples include aminoalkyl alkoxysilanes and hydroxyalkyl alkoxysilanes.

The carrier, to which the polymerizable functional group is bonded, which is used in the present invention, is preferably surface-modified silica gel obtained through silane coupling of the compound represented by Formula (I) and silica gel.

Apart from using the compound represented by Formula (I), it is also possible to firstly couple silica gel, as the carrier, with a compound (for instance an aminoalkyl alkoxysilane or a hydroxyalkyl alkoxysilane) having the structure —Y—$SiR_{3-n}Z_n$ of Formula (I), followed then by a reaction using a compound having the structure represented by W (for instance, an α-(alkyl)acrylic acid in which a hydrogen of a carbon bonded to the vinyl group is unsubstituted or substituted with an alkyl).

In a case where production method (1) explained above is used, the stationary phase of the present invention is obtained through copolymerization of 1-vinyl-2-pyrrolidone and a carrier having a polymerizable functional group bonded thereto.

Copolymerization can be implemented by triggering copolymerization of both the vinyl group of 1-vinyl-2-pyrrolidone and the polymerizable functional group. The reaction conditions involved may be those of known methods.

The stationary phase of the present invention obtained from the starting materials and in accordance with the production method explained above has the following structure.

[C6]

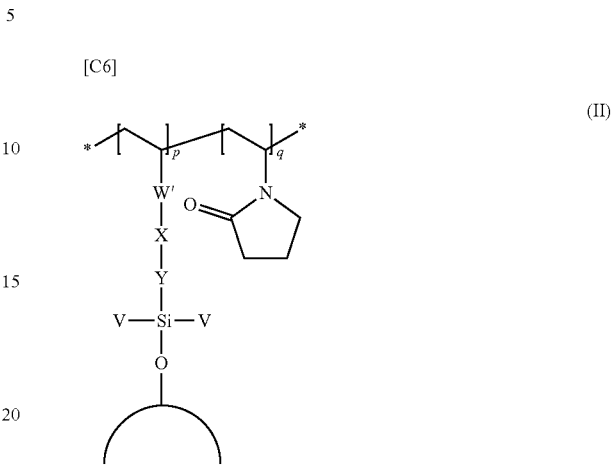

(II)

(In Formula II, W' is a group derived from W in Formula (I) and generated through addition polymerization; X is an amide group, an ester group, a N-alkylamide group having carbon number of 1 to 3, an ether group, a sulfoxide group, a sulfone group, a sulfide group, a phenylene group or a phosphate ester group; Y is an alkylene group having carbon number of 1 to 30; and V is an ether group bonded to the carrier surface, or an unreacted Z group or R group in Formula (I) above.)

Examples of W' in Formula (II) include a single bond and an unbranched or branched alkylene group having carbon number of 1 to 10. Preferred examples among the foregoing include single bonds, methylene groups, ethylene groups and trimethylene groups.

Preferred X and Y groups in Formula (II) include the same groups as in Formula (I) above.

In Formula (II), p may be 1 to 10, and q may be from about 10 to 300; preferably, q is 15 to 250 and yet more preferably 20 to 200. In a case where both p and q are equal to or greater than 2, the units having the pyrrolidone residue and the units bonded to the carrier in Formula (II) look like appear ostensibly as a continuous block copolymer, but Formula (II) represents only the number of respective residues, and thus it is assumed that the copolymer is actually a random copolymer.

Regarding V in Formula (II), there holds V=R when n=1, while in a case where n=2, the proportion of R groups with respect to the number of all V is 50%, and the proportion of unreacted Z groups, or a structure derived from replacement of the Z groups by the carrier surface as a result of the reaction, is 0% to 50% or 50% to 0%, respectively, and in a case where n=3, the proportion of unreacted Z groups, or a structure derived from replacement of the Z groups by the carrier surface as a result of the reaction, is 0% to 100% or 100% to 0%, respectively.

Production method (2) of the stationary phase of the present invention will be explained next.

Production method (2) includes: a step of radical polymerization in the presence of a chain transfer agent having a reactive silyl group at one end; and a step of silane coupling for the obtained polymer, on the carrier surface.

Examples of the chain transfer agent having a reactive silyl group at one end, and being used in production method (2), include the compounds represented by Formula (III) below. The reactive silyl group of the present invention is a silyl group having bonded thereto a leaving group such as the one denoted by Z in Formula (III), and having the property of forming bonds of the form Si—O-M, through condensation of a metal hydroxide containing silicon. The same applies to compounds used in the other production methods below.

[C7]

$R_{3-n}Z_nSi-Y-T$ (III)

(In Formula (III), R is each independently an alkyl group having carbon number of 1 to 5; Z is a leaving group capable of creating a bond between the silicon atom in Formula (III) and the carrier; Y is an alkylene group having carbon number of 1 to 30; T is a chain transfer functional group; and n is an integer from 1 to 3.)

In Formula (III), preferably, R is a methyl group, an ethyl group or a propyl group. Further, Z is a leaving group, and may be any atomic group so long as Z is capable of creating a bond between the silicon atom in Formula (III) and oxygen that constitutes silica gel.

Due to improved balance between handleability and reactivity, the leaving group ordinarily used is an alkoxy group having carbon number of 1 to 5. Examples thereof include methoxy groups and ethoxy groups. There can also be used halogens (chlorine, bromine or iodine), nitrogen-containing groups such as dimethylamino groups, diethylamino groups, pyrrolidino groups and imidazolyl groups, as well as allyl groups and isopropenyl groups. The reaction conditions (including catalyst addition) can be adjusted depending on the type of the leaving group. Further, Y is more preferably an alkylene group having carbon number of 1 to 10. Herein, T is a chain transfer functional group. The chain transfer functional group is a functional group which, in a polymerization reaction, gives rise to a chain transfer reaction with migration of a growing active species and restart reactions. The molecular weight and the end structure of the produced polymer can be controlled to a certain extent due to the presence of the chain transfer functional group. Preferred examples of the chain transfer functional group are halogenated alkyl groups having carbon number of 1 to 12, alkyl groups having carbon number of 1 to 12 and having a thiol at an end, and alkyl groups having 1 to 12 and having a disulfide group within the group.

The halogen in the halogenated alkyl group having carbon number of 1 to 12 may be chlorine, bromine or iodine, and the alkyl group may be an alkyl group having carbon number of 1 to 3.

A compound having the structure represented by Formula (IV) below can be obtained through radical polymerization of 1-vinyl-2-pyrrolidone, in the presence of such a chain transfer agent, using a small amount of a radical generator as a catalyst. The molecular weight can be controlled to a certain extent on the basis of the molar ratio of the chain transfer agent and the monomers. The radical generator that is used can be a known radical generator used in polymerization reactions. Examples thereof include for instance azo compounds and peroxides.

[C8]

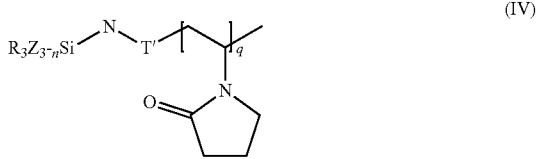

(IV)

(In Formula IV, T' is a group derived from T in Formula (III) and being and generated as a result of a chain transfer reaction. Further, Y, R and Z have the same meaning as in Formula (III), and q is an integer from 2 to 300.)

In a case where T is an alkyl group having carbon number of 1 to 12 and having a halogen bonded to an end, T' in Formula (IV) is an alkylene residue having carbon number of 1 to 12 resulting from replacement of the halogen, while T' is a thioether in a case where T is an alkyl group having carbon number of 1 to 12 and having a thiol at an end or an alkyl group having carbon number of 1 to 12 and having a disulfide group within the group.

The same carrier used in production method (1) can be used as the carrier that is used in production method (2) of the stationary phase of the present invention.

A known silane coupling method can be used as the method for bonding the compound represented by Formula (IV) and the carrier as a result of a silane coupling reaction.

It is deemed that the stationary phase obtained through bonding of the compound represented by Formula (IV) and the carrier has the structure below.

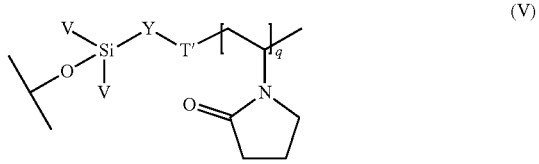

(V)

(In Formula V, T' is a group derived from T in Formula III and being and generated as a result of a chain transfer reaction; q is an integer from 2 to 300; and V is an ether group bonded to the carrier surface or an unreacted Z group or R group in Formula (III)).

Regarding V in Formula (V), there holds V=R when n=1, while in a case where n=2, the proportion of R groups with respect to the number of all V is 50%, and the proportion of unreacted Z groups, or a structure derived from replacement of the Z groups by the carrier surface as a result of the reaction, is 0% to 50% or 50% to 0%, respectively, and in a case where n=3, the proportion of unreacted Z groups, or a structure derived from replacement of the Z groups by the carrier surface as a result of the reaction, is 0% to 100% or 100% to 0%, respectively.

Production method (3) will be explained next.

A polymer containing a pyrrolidone backbone in repeating units of the main chain can be introduced on a carrier surface, such as silica gel, through introduction of a stable covalent bond that yields a dormant species, on the carrier surface, and by performing living radical polymerization from the surface.

This method allows introducing a polymer containing a pyrrolidone backbone in repeating units of the main chain, on the surface of a carrier such as silica gel, at a high density, and allows obtaining a brush-like polymer that is highly orientable.

Widely used examples of the above feature "introduction of a stable covalent bond that yields a dormant species, and living radical polymerization" are illustrated in (i) to (iii) below.

(i) Polymerization of 1-vinyl-2-pyrrolidone can be conducted in accordance with a living scheme by introducing a carbon-halogen bond that can be activated by a transition metal catalyst such as copper, iron, ruthenium or the like, on the surface of a carrier such as silica gel, and through reversible withdrawal and pullback of the halogen by a one-electron redox mechanism. By using this technique it becomes possible to introduce a polymer that includes a pyrrolidone backbone in repeating units of the main chain, at high density, on the surface of a carrier such as silica gel.

(ii) Herein the polymerization reaction is controlled in that when for instance an alkoxyamine is introduced on the surface of a carrier such as silica gel and the carbon-oxygen bond of the alkoxyamine thermally decomposes to yield a carbon radical and a nitroxide, the growing carbon radical is reversibly and quickly capped by the nitroxide as polymerization of N-methyl-2-pyrrolidone proceeds, and the growing carbon radical is brought as a result back to a dormant species. By using this technique it becomes possible to introduce a polymer that includes a pyrrolidone backbone in repeating units of the main chain, at high density, on the surface of a carrier such as silica gel.

(iii) In a case where a thiocarbonyl compound or iodine compound is introduced on the surface of the carrier such as silica gel, reversible chain transfer occurs quickly through an exchange reaction of the dormant species and the radical species between polymer ends; as a result, molecular weight can be controlled in that all the polymer chains have the opportunity to grow in the same manner. By using this technique it becomes possible to introduce a polymer that includes a pyrrolidone backbone in repeating units of the main chain, at high density, on the surface of a carrier such as silica gel.

In all (i) to (iii) above there can be used, other than silica gel, the same carriers that are utilized in production methods (1) and (2) above.

Production method (4) will be explained next.

This production method includes a step of copolymerizing a silane coupling agent having a polymerizable double bond and N-methyl-2-pyrrolidone; and a step of silane coupling for the obtained polymer, on the carrier surface.

Examples of the silane coupling agent having a polymerizable double bond include for instance compounds having the structure represented by Formula (I) below.

[C9]

(In Formula (I), W is a vinyl group, an allyl group, an isopropenyl group or an alkenyl group having carbon number of 4 to 12 and having a double bond at the ω position; X is an amide group, an ester group, a N-alkylamide group having carbon number of 1 to 3, an ether group, a sulfoxide group, a sulfone group or a phosphate ester group; R is each independently an alkyl group having carbon number of 1 to 5; Z is a leaving group capable of creating a bond between the silicon atom of Formula (I) and the carrier; Y is an alkylene group having carbon number of 1 to 30; and n is an integer from 1 to 3.)

In Formula (I), preferably, Y is an alkylene having carbon number of 1 to 5, and more preferably any one of a methylene group, an ethylene group and a trimethylene group.

Preferably, R is a methyl group or an ethyl group.

Further, Z is a leaving group, and may be any atomic group so long as Z is capable of creating a bond between the silicon atom in Formula (I) and, in a case for instance where the carrier is silica gel, oxygen that makes up the silica gel. Also in a case where the carrier is not silica gel, Z is a leaving group capable of creating a bond with the atom that constitutes the carrier.

In order to improve the balance between handleability and reactivity, the leaving group ordinarily used is an alkoxy group having carbon number of 1 to 5. Examples thereof include methoxy groups and ethoxy groups. Other examples include halogens (chlorine, bromine or iodine), nitrogen-containing groups such as dimethylamino groups, diethylamino groups, pyrrolidino groups and imidazolyl groups, as well as allyl groups and isopropenyl groups). The reaction conditions (including catalyst addition) can be adjusted depending on the type of the leaving group.

Other than silica gel, carriers identical to those of used in production methods (1) and (2) can be used as the carrier in production method (4) as well. Also the same 1-vinyl-2-pyrrolidone as in production methods (1) and (2) can be used herein.

In this production method molecular weight can be controlled by using an appropriate chain transfer agent and by using the above-described living radical polymerization during polymer synthesis. A known silane coupling method can be utilized as the method for bonding the obtained polymer and the carrier as a result of a silane coupling reaction.

Method (5) will be explained next.

This production method includes a step of introducing a chain transfer functional group on a carrier surface, and causing radical polymerization of 1-vinyl-2-pyrrolidone.

The carrier to which a chain transfer functional group such as the above is bonded is obtained for instance through silane coupling of the compound represented by Formula (VI) and silica gel, in a case where silica gel is used as the carrier.

[C10]

(In Formula (VI), T is a chain transfer functional group; Y is an alkylene group having carbon number of 1 to 30; R is each independently an alkyl group carbon number of 1 to 5; Z is a leaving group capable of creating a bond between the silicon atom of Formula (VI) and the carrier; and n is an integer from 1 to 3.)

In Formula (VI), preferably, R is a methyl group, an ethyl group or a propyl group. Further, Z is a leaving group, and may be any atomic group so long as Z is capable of creating a bond between the silicon atom in Formula (VI) and, in a case where the carrier is silica gel, oxygen that constitutes the silica gel. Also in a case where the carrier is not silica gel, Z is a leaving group capable of creating a bond with the atom that constitutes the carrier.

Herein there can be preferably used the same T as in (2), and the same R and Z as in (1), (2) and (4).

The carrier, to which the chain transfer functional group is bonded, that is utilized in the present invention, is preferably surface-modified silica gel obtained through silane coupling of the compound represented by Formula (VI) and silica gel.

The polymer can be immobilized on the carrier surface through radical polymerization of N-methyl-2-pyrrolidone using a small amount of a radical generator as a catalyst, in the presence of the carrier on the surface of which the chain transfer functional group has been introduced (chemically bonded). Other than silica gel, carriers identical to those of used in production methods (1) and (2) can be used as the carrier in production method (5) as well. The same radical generator used in production method (2) can be used herein as the radical generator.

Method (6) will be explained next.

This production method includes a step of obtaining a polymer through anionic polymerization of 1-vinyl-2-pyrrolidone and an anionic initiator having a reactive silyl group at the starting end; and a step of silane coupling for the obtained polymer, on the carrier surface.

The anionic initiator having a reactive silyl group at the starting end is obtained for instance through silane coupling of the compound represented by Formula (VII) and silica gel, in a case where silica gel is used as the carrier.

[C11]

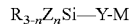

$R_{3-n}Z_nSi-Y-M$ (VII)

(In Formula (VII), R is each independently an alkyl group having carbon number of 1 to 5; Z is a leaving group capable of creating a bond between the silicon atom of Formula (VII) and the carrier; Y is a branched or linear alkylene group having carbon number of 1 to 30 and any hydrogen whereof is unsubstituted or substituted with a group having an aromatic ring; M is an alkali metal or an alkaline-earth metal; and n is an integer from 1 to 3.)

In Formula (VII), R is preferably a methyl group, an ethyl group or a propyl group, and Y and Z are preferably identical to those of Formula (I). Further, M can be preferably lithium, sodium, potassium or magnesium.

For instance an alkyl group having carbon number of 4 to 20 and having one or two phenyl groups, more specifically a 1,1-diphenylhexyl group or the like can be used as the group having an aromatic ring and with which any hydrogen of Y is unsubstituted or substituted.

A polymer that includes, in the repeating units of the main chain, a pyrrolidone backbone having a reactive silyl group at one end, can be synthesized in accordance with a known method, in the presence of such an anionic initiator.

In case of difficult introduction of a direct silane coupling agent at the starting end through a side reaction during polymerization, such introduction can be achieved by synthesizing a derivative in which the starting end is protected by a protecting group, and by deprotecting then the derivative after polymerization, to quantitatively convert to the silane coupling agent. A known silane coupling method can be used as the method for bonding the obtained polymer and the carrier as a result of a silane coupling reaction.

Method (7) will be explained next.

This production method includes a step of obtaining a polymer through anionic polymerization of an anionic initiator and 1-vinyl-2-pyrrolidone, and by action of a terminating agent having a reactive silyl group; and a step of silane coupling for the obtained polymer, on the carrier surface. In the case of difficult introduction of a direct silane coupling agent at the termination end, such introduction can be achieved through termination using a derivative protected with a protecting group, followed by deprotection, to quantitatively convert to the silane coupling agent.

Known methods can be used for polymerization using an anionic initiator. The terminating agent having a reactive silyl group that is used herein may be for instance the compound represented by Formula (VIII) below.

[C12]

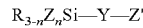

$R_{3-n}Z_nSi-Y-Z'$ (VIII)

(In Formula (VIII), R is each independently an alkyl group having carbon number of 1 to 5; Z is a leaving group capable of creating a bond between the silicon atom of Formula (VIII) and the carrier; Y is a branched or linear alkylene group having carbon number of 1 to 30 and any hydrogen whereof is unsubstituted or substituted with a group having an aromatic ring; Z' is a group eliminated in the reaction between the end of a growing anion and the terminating agent; and n is an integer from 1 to 3.)

Examples of Z include preferably those enumerated as Examples in Formula (I).

Examples of Z' include for instance halogens (chlorine, bromine or iodine) and alkoxy groups having carbon number of 1 to 5, and preferably, among the foregoing, methoxy groups or ethoxy groups, alkylmercaptyl groups, nitrogen-containing group such as dimethylamino groups, diethylamino groups, pyrrolidino groups, imidazolyl groups, as well as allyl groups and 2-methyl-2-propenyl groups. The reaction conditions (including catalyst addition) can be adjusted depending on the type of the leaving group.

For instance an alkyl group having carbon number of 4 to 20 and having one or two phenyl groups, more specifically a 1,1-diphenylhexyl group or the like can be used as the group having an aromatic ring and with which any hydrogen of Y is unsubstituted or substituted.

A known silane coupling method can be used as the method for bonding the obtained polymer and the carrier as a result of a silane coupling reaction.

Production method (8) will be explained next.

This production method includes a step of mixing a carrier with a composition that contains 1-vinyl-2-pyrrolidone, a cross-linking agent and an initiator, and causing a crosslinking reaction.

The production method involves obtaining an insoluble polymerization product through copolymerization of the monomer and a cross-linking agent. Specifically, 1-vinyl-2-pyrrolidone and a cross-linking agent in the form of, for instance divinylbenzene, methylene bisacrylamide, ethylene glycol dimethacrylate or the like, can be mixed with a radical initiator, as needed, in an appropriate amount of 0.01 to 1 equivalents with respect to the monomer, and with a solvent, the resulting mixture is allowed to adsorb onto the carrier, and conditions can be brought about in which polymerization is initiated by the initiator.

Known initiators used in ordinary radical polymerization reactions can be used as the radical initiator. Examples thereof include for instance azo compounds and peroxides.

Production method (9) will be explained next.

Production method (9) is disclosed in detail in Non-patent document 2.

Firstly, a carrier is dispersed in a solution of poly(vinylpyrrolidone), and the solvent is removed. After solvent removal, the carrier having had the surface thereof coated with poly(vinylpyrrolidone) is heated. The temperature at that time can lie in the range of about 50° C. to 180° C. Poly(vinylpyrrolidone) becomes immobilized on the carrier through heating. Thereafter, γ-rays or electron beams are irradiated to trigger a crosslinking reaction, and thereby bonding between the carrier and the poly(vinylpyrrolidone).

The stationary phases obtained in accordance with any of methods (1) to (9) above deliver excellent performance as a stationary phase for supercritical fluid chromatography.

The weight-average molecular weight of the polymer that includes a pyrrolidone backbone in repeating units of the main chain, and being supported on the carrier of the stationary phase of the present invention obtained in accordance with the above operations, is preferably 1,000 to 5,000,000. The weight-average molecular weight of the polymer in the present invention applies to $-(CH_2-CAB)_n-$ sites being the repeating units of the main chain, in the case for instance of the structure represented by Formula (II) and Formula (IV).

The weight-average molecular weight lies preferably within the above range from the viewpoint of, for instance, the solubility of the polymer in a solvent, preventing aggregation of particles when the polymer is allowed to be supported on the carrier, suppressing dissolution in the mobile phase solvent, and maintaining the amount of binding during chemical bonding to the carrier. Optimal points vary depending on polymer type.

Polymerization of 1-vinyl-2-pyrrolidone and immobilization onto silica gel occur simultaneously in production method (1) of the stationary phase of the present invention, and accordingly the weight-average molecular weight is estimated on the basis of the supernatant of a polymerization solution.

The weight-average molecular weight of the polymers including a pyrrolidone backbone in repeating units of the main chain, produced in production methods (2), (4), (6) and (7), is measured before bonding of the polymer to the carrier.

The weight-average molecular weight is measured by gel permeation chromatography (GPC) based on a polystyrene standard.

Among the stationary phases of the present invention, the polymer that includes a pyrrolidone backbone in repeating units of the main chain is covalently bonded to the carrier surface in the stationary phases obtained in accordance with production methods (1) to (7). Accordingly, these polymers do not dissolve, and thus the functionality of the stationary phase is not impaired, even when solvents that can originally dissolve these polymers, or mixed solvents of such solvents, are used as a developing solvent.

Among the stationary phases of the present invention, the polymers are crosslinked to each other on the carrier in the stationary phases obtained in accordance with production methods (8) and (9); as a result, the stationary phases do not dissolve even when a solvent that can originally dissolve these polymers, or mixed solvents of such solvents, are used as the developing solvent.

The specific surface area of the stationary phase of the present invention corresponds to the specific surface area of the carrier to be used; accordingly, it suffices to select a carrier having a desired specific surface area. The carrier can be adjusted by selecting an appropriate product, for instance in a case where the carrier is silica gel. In an implementation where the polymer is supported on the carrier, the specific surface area of the stationary phase can ordinarily be regarded as identical to the specific surface area of the carrier to be used, since there is no change in specific surface area, exceeding a given error, between before and after the polymer is supported on the carrier.

The average particle size of such a carrier, usable in the present invention, is ordinarily 0.1 to 1000 μm, preferably 1 to 50 μm, and the average pore size is ordinary 10 to 10000 Å, preferably 50 to 1000 Å.

The specific surface area of the carrier is ordinary 5 to 1000 $m^2/g$, preferably 10 to 500 $m^2/g$. In a case where the polymer is supported on the carrier, the average particle size of the stationary phase can ordinarily be regarded as identical to the average particle size of the carrier to be used, since there is no change in specific surface area, exceeding a given error, between before and after the polymer is supported on the carrier. In a case where the stationary phase of the present invention is in particulate form, the average particle size of the stationary phase may be for instance of 0.1 μm to 1000 μm, preferably 1 to 50 μm.

The average thickness (supported amount per g of carrier/carrier specific surface area) of the polymer supported on the carrier is ordinarily $2/10^5$ to $2/10^7$ (μm) preferably $4/10^5$ to $5/10^7$ (μm). This is preferable in that peaks tend to be sharp within the above ranges.

In the stationary phase in which a polymer is thus supported on a carrier, the proportion (%) of parts by mass of polymer contained in 100 parts by mass of stationary phase is preferably 1 to 50 mass %, more preferably 3 to 30 mass % and yet more preferably 5 to 20 mass %. Adopting such proportions is preferable since doing so allows bringing out the adsorption capacity of polymer while avoiding wasteful reinforced retention and peak broadening.

The proportion (%) of parts by mass of polymer contained in 100 parts by mass of stationary phase can be measured through elemental analysis. The proportion of parts by mass of polymer in the stationary phase is calculated assuming that the carbon other than carbon contained in the carrier before supporting the polymer derives entirely from the polymer, on the basis of the carbon content of the carrier before supporting the polymer and the measurement result of the carbon content of the obtained stationary phase.

The average particle size of the stationary phase of the present invention when in particulate form is denoted by the diameter of the particles, in the case of spherical particles, and by the diameter of a sphere equivalent to the volume of the particles, in the case of irregular particles. Average particle size can be measured using a device for measurement relying on micrographs, for instance Mastersizer 2000E by Malvern Instruments Ltd.

In a case where the stationary phase of the present invention is used in particulate form, the particles have an aspect ratio of 2 or less, and are preferably spherical particles having an aspect ratio of 1.5 or less. The lower limit of aspect ratio, down to 1, is not particularly restricted since the closer to a perfect sphere, the more preferable the particles are.

The aspect ratio can be measured as described below. A sample is observed using an electronic microscope or optical microscope, directly from above, in a state resulting from being randomly scattered on an observation stage; in an arbitrary screen within which ten or more independent primary particles (not in contact or overlapping with other particles) are observed, there is worked out the major axis and minor axis (length of the longest portion perpendicular to the major axis) of each independent primary particle within the screen, and the ratio of the foregoing axes is taken as the aspect ratio of individual particles. A value being the arithmetic average of the aspect ratios for all independent primary particles within the screen is taken as the aspect ratio in the present invention. The term primary particle denotes particles having clearly observable interfaces with other particles. Observations are ordinarily carried out with the particles appropriately dispersed, so as to avoid overlap of primary particles on the sample stage, but nevertheless some accidental overlap is inevitable. Further, bulk particles resulting from aggregation of a plurality of primary particles are excluded from the particles to be observed.

The stationary phase of the present invention can be used as a stationary phase in supercritical fluid chromatography (SFC).

When used in SFC, the stationary phase of the present invention exhibits excellent separation characteristics towards acidic compounds and basic compounds, and exhibits excellent separation characteristics towards substances that are difficult to separate by HPLC, for instance fused ring aromatic compounds and isomers of aromatic compounds.

The stationary phase of the present invention can be used for packing of a column for supercritical fluid chromatography, for instance such as the one disclosed in Japanese Patent Application Publication No. 2006-058147.

A fluid containing a supercritical fluid and a solvent are used as the mobile phase in supercritical fluid chromatography. The term supercritical fluid chromatography as used herein is a common denomination for chromatography in which a supercritical fluid is used as the main mobile phase. The above supercritical fluid is a substance in a state at or above the critical pressure and at or above the critical temperature (i.e. in a supercritical state). Examples of the substance that can be used as a supercritical fluid include for instance carbon dioxide, ammonia, sulfur dioxide, hydrogen halides, nitrous oxide, hydrogen sulfide, methane, ethane, propane, butane, ethylene, propylene, halogenated hydrocarbons, water and the like, but the substance refers substantially to carbon dioxide, in terms of appropriate critical conditions, safety and cost. Supercriticality in a strict sense is not required herein, and the term "supercritical fluid chromatography" encompasses uses in a sub-critical state.

As the above solvent there are selected one, two or more types of known solvents, for instance in accordance with the type of target substance and the type of supercritical fluid. Examples of the solvent include for instance lower alcohols such as methanol, ethanol, 2-propanol or the like, ketones such as acetone, as well as acetonitrile, ethyl acetate, THF and the like. Further, small amounts of water, acids, amine bases, ammonium salts or the like may be added in order to improve peak shape during separation of basic, acidic amphoteric and polar compounds.

The above supercritical fluid chromatography is not particularly limited so long as a fluid containing the supercritical fluid and the solvent is used as the mobile phase. The above supercritical fluid chromatography that utilizes the stationary phase of the present invention may be used for analysis or for fractioning purposes.

The above supercritical fluid chromatography for fractioning is not particularly limited so long as it includes a step of separating the mobile phase in a fraction collector after passage through the column, in accordance with the target substance having been separated in the column.

A column of known size can be used as the column to be packed.

The flow rate as well can be adjusted as appropriate. In the case for instance of a column having an inner diameter of 0.46 mm there can be adopted for instance a flow rate of 0.3 to 10 mL/min, preferably of 1 to 6 mL/min.

The column temperature can be of about 0° C. to 50° C., or of about 20° C. to 40° C.

The back pressure can be of about 120 to 180 bar, or of about 130 to 160 bar.

The stationary phase of the present invention can be used as a monolith. In a case where the stationary phase of the present invention is to be used monolithically, a monolith can be obtained by causing N-methyl-2-pyrrolidone to react with a carrier having a polymerizable functional group bonded thereto and molded monolithically beforehand, or a carrier having bonded thereto a polymerizable functional group and being a starting material that yields a carrier when molded monolithically.

The stationary phase for supercritical fluid chromatography of the present invention is excellent in separation performance of acidic compounds such as phenylpropionic acid-based NSAIDS, basic compounds such as a caffeine analogues, aromatic and polycyclic aromatic hydrocarbons such as triphenylene and terphenyl, and other compounds having a wide range of polarity.

EXAMPLES

The present invention will be explained in specific terms next with reference to examples. However, the invention is not limited to the implementations in the examples below.

Example 1

(Treatment of silica gel with N-methyl-N-[3-(trimethoxysilyl)propyl]2-propenamide)

Preparation Example 1

Herein 200 mL of toluene, 3.91 g of trimethoxy[3-(methylamino)propyl]silane, 2.74 g of triethylamine and about 50 mg of 4-pyrrolidylpyridine were charged into a 300 mL three-necked flask, and then a mixed solution of 2.10 g of acryloyl chloride and 4 mL of toluene was dropped into the flask, while under stirring. Once dropping was over, the whole was heated at 80° C. for about 3 hours, to yield a light brown liquid having suspended therein a crystalline product (triethylamine hydrochloride).

Meanwhile 20.60 g of silica gel having nominal pore size of 300 Å and a particle size of 5 μm, and having been vacuum-dried at 160° C., were charged in a 300 mL three-necked flask, and a stirring blade was set. The light brown liquid obtained in the above reaction was caused to flow into the flask, via a glass filter, and the solid remaining on the glass filter was washed with 50 mL of toluene. The flask was heated, while under stirring, at 90° C. for 1 hour and at 125° C. for 5 hours, in an oil bath. During this time about 100 g toluene were distilled off a side tube. The obtained silica gel was filtered on a 0.5 μm membrane filter, and was washed with 50 mL of N-methyl-2-pyrrolidone (NMP), 100 mL of methanol and 50 mL of acetone, followed by vacuum drying at 60° C.

The weight increase rate, for a yield of 21.74 g, was 6.5%.

The elemental analysis values were C: 2.65, H: 0.55 and N: 0.44 (all %).

Copolymerization of 1-vinyl-2-pyrrolidone (VP) on the silica gel obtained in Preparation example 1

Herein 984 mg of VP, 4.2 mL of NMP and 23 mg of azobisisobutyronitrile (AIBN) were mixed and had nitrogen bubbled therethrough, after which the mixture was transferred to a flask holding 2.084 g of the silica gel obtained in Preparation example 1. The liquid was mixed uniformly, and the flask was purged with nitrogen, and thereafter the flask was connected to a rotary evaporator and was warmed at 65° C., 80° C. and 90° C., for 2 hours each, while the flask was being rotated. The liquid obtained was transferred to a 5.5

μm glass filter, and was washed several times each with 50 mL of NMP, with 50 mL of methanol and with 50 mL of acetone, followed by vacuum drying (60° C.). The weight increase with respect to the silica gel obtained in Preparation example 1 was 8.5%, for a yield of 2.262 g, and the silica gel elemental analysis values were C: 7.91, H: 1.37 and N: 1.48 (all %).

It can be estimated that the obtained poly(l-vinyl-2-pyrrolidone)-bonded silica gel has the structure below.

[C13]

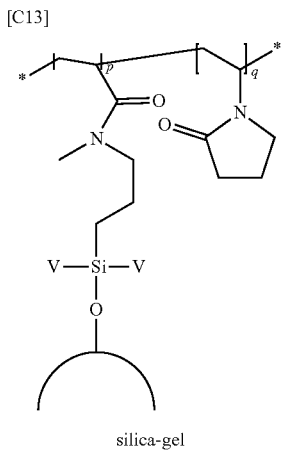

silica-gel

Example 2

Filler from 120 Å Silica Gel

Herein 2098 mg of silica gel having a nominal pore size of 120 Å and a diameter of 5 μm and having been vacuum-dried at 160° C., 123 mg of trimethoxy[3-(methylamino)propyl]silane, and 20 mL of dry toluene were charged into a 50 mL eggplant flask A; the flask A was connected to a rotary evaporator, and was held at 90° C. for 2 hours, was thereafter gradually warmed, and was held at 118° C. for 3 hours, while being rotated. During this time about 4.5 g of toluene moved to a trap. Then 212 mg of triethylamine and 114 mg of acryloyl chloride were added to the obtained silica gel dispersion, and the temperature was kept at 97° C. for 1 hour while under rotation. After cooling, the product was transferred to a 5.5 μm glass filter together with 10 mL of methanol, the whole was washed thrice with 10 mL of methanol, and was vacuum dried (60° C.). The weight of the obtained silica gel was 2.267 g, and the elemental analysis values were C: 2.91%, H: 0.84% and N: 0.49%.

A liquid resulting from mixing 618 mg of VP, 8.9 mg of AIBN and 2.5 mL of acetone was dropped onto 2216 mg of the obtained silica gel, and the whole was mixed uniformly with a spatula. A container with the resulting mixture was depressurized using a vacuum pump, for removal of the acetone, was filled with nitrogen, and was warmed, for 2 hours each, at 70° C., 80° C. and 90° C. The obtained silica gel was washed with 40 mL of methanol, 30 mL of NMP, 30 mL of methanol, and 32 mL of acetone, and was then vacuum dried. The yield was 2.637 g. The weight increase with respect to the surface-treated silica gel was 19.0%, and the elemental analysis values were C: 10.2, H: 1.7 and N: 1.82.

The obtained poly(l-vinyl-2-pyrrolidone)-bonded silica gel was deemed to have a structure similar to that of Example 1.

Example 3

Preparation of Acrylamide-Bonded Silica Gel by a Bifunctional Coupling Agent

A reaction was conducted in the same way as in Example 1, but using herein 690 mg of dimethoxy[3-(methylamino)propyl]methylsilane instead of trimethoxy[3-(methylamino)propyl]silane, 786 mg of triethylamine, 30 mL of toluene, 537 mg of acryloyl chloride and 5.5 mL of toluene; the resulting reaction solution was poured on 4427 mg of silica gel identical to that of Example 1, the whole was heated, and the obtained silica gel was filtered and washed. The yield was 4721 mg (6.65% weight increase), and the elemental analysis values were C: 3.52, H: 0.7 and N: 0.5.

Then 2081 mg of the obtained silica gel were dispersed in a solution composed of 965 mg of VP, 4.0 mL of NMP and 18.9 mg of AIBN, and a reaction was conducted in the same way as in Example 1, to obtain 2350 mg of silica gel (12.9% weight increase). The elemental analysis values were C: 10.2, H: 1.7 and N: 1.82.

The obtained poly(l-vinyl-2-pyrrolidone)-bonded silica gel was deemed to have a structure similar to that of Example 1.

<Example 4> Preparation of Mercapto Group-Bonded Silica Gel

Preparation Example 2

Herein 25 mL of toluene and 523 mg of trimethoxy(mercaptopropyl)silane were poured on 2233 mg of vacuum-dried silica gel (pore size 300 Å, diameter 5 μm) in a 50 mL eggplant flask, the flask was connected to a rotary evaporator, and the bath temperature was raised from 105° C. to 125° C. over 3 hours 25 minutes while under rotation of the flask. During this time about 10 mL of a liquid (mainly toluene) moved to a trap. After cooling of the flask, the silica gel was filtered using a 5.5 μm glass filter, was washed four times with 15 mL of methanol and twice with 15 mL of acetone, and was dried in a vacuum dryer at 60° C. There were obtained 2310 mg of mercapto group-bonded silica gel. The weight increase was 3.4%, and the elemental analysis values were C: 1.72, H: 0.56 and N: 0%.

Bonding in Accordance with an Iniferter Method Using —SH

A solution resulting from dissolving 696 mg of VP and 15 mg of AIBN (azobisisobutyronitrile) in 3 mL of acetone was allowed to adsorb onto 2.221 g of the mercapto group-bonded silica gel obtained in Preparation example 2, and the whole was mixed uniformly using a spatula. Thereafter, pressure was lowered using a vacuum pump (1 Torr), to remove the acetone. The flask was then filled with nitrogen and was warmed in a bath at 65° C., 80° C. and 90° C., for 2 hours at each temperature. The resulting powder after cooling was transferred to a 5.5 μm glass filter together with an appropriate amount of methanol, was washed thrice with 15 mL of methanol, thrice with 15 mL of NMP, thrice with 15 mL of methanol, and thrice with 10 mL of acetone, and was dried in a vacuum dryer at 60° C. The powder after drying was 2.499 g. The weight increase was 11.9%, and the elemental analysis values were C: 8.18, H: 1.48 and N: 1.31%.

It can be estimated that the obtained poly(l-vinyl-2-pyrrolidone)-bonded silica gel has the structure below.

[C14]

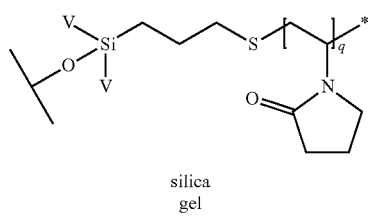

silica gel

Example 5

Preparation of Methacryloxy Group-Bonded Silica Gel

Preparation Example 3

In a flask connected to a rotary evaporator there were gradually heated 2.187 g of the same silica gel as that used in Example 1 having been vacuum-dried at 160° C., together with 25 mL of toluene, 10 μL of trifluoroacetic acid and 500 μL of trimethoxy(3-methacryloyloxypropyl)silane, from 105° C. to 120° C. over 3 hours and 30 minutes. During this time about 10 mL of liquid moved to a trap. The treated silica gel was transferred to a 5.5 μm glass filter after cooling, was filtered, was washed twice with 8 mL of NMP, thrice with 10 mL of methanol and twice with 8 mL of acetone, and was vacuum-dried at 60° C., to yield 2.307 g of a powder. The weight increase was 5.5%, and the elemental analysis values were C: 2.64, H: 0.55 and N: 0.00%.

Then 2.194 g of the methacryloyloxy group-bonded silica gel obtained in Preparation example 3 were dispersed in a solution of 1.0 mL of VP, 4.0 mL of NMP and 22.8 mg of AIBN, in the same way as in Example 1, with connection to a rotary evaporator and warming at 70° C., 80° C. and 90° C., for 2 hours at each temperature, in a nitrogen atmosphere, while under rotation. The main solution was cooled, was diluted through addition thereto of 5 mL of NMP, was transferred to a 5.5 μm glass filter, was washed with about 7 mL of NMP, thrice with about 7 mL of methanol and thrice with about 7 mL of acetone, and was vacuum-dried at 60° C. The yield was 2.364 g (weight increase 7.8%), and the elemental analysis values were C: 6.91, H: 1.16 and N: 0.90%.

It can be estimated that the obtained poly(l-vinyl-2-pyrrolidone)-bonded silica gel has the structure below.

[C15]

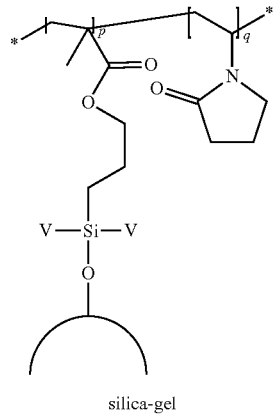

silica-gel

Example 6

Bonding to 3 μm Silica Gel

The same treatment as in Preparation example 1 was performed on 4.427 g of silica gel having an average particle size of 3 μm and an average pore size of 300 Å, to yield 4.721 g of surface-treated silica gel (weight increase 6.6%).

Then a solution composed of 1343 mg of VP, 4.00 mL of NMP and 25.6 mg of azobisisobutyronitrile, after having had nitrogen bubbled therethrough, was poured on 2.090 g of the silica gel obtained above. The resulting slurry was kept at 73° C. for 12 hours, while under stirring in nitrogen. The obtained silica gel was washed with 20 mL each of NMP, methanol and acetone, on a glass filter, in the same way as in Preparation example 2, and was vacuum-dried at 60° C. The yield was 2.440 g (weight increase 16.7%).

Slurries of the silica gels obtained above were packed into respective 4.6 mm×150 mm columns, to produce columns for HPLC. Further, the slurries were packed into 4.6 mm×150 mm columns having guaranteed pressure resistance in conformity with the High Pressure Gas Safety Act, to produce columns for SFC. These columns were used in the separation examples below.

Separation Example 1

Figure 1B:
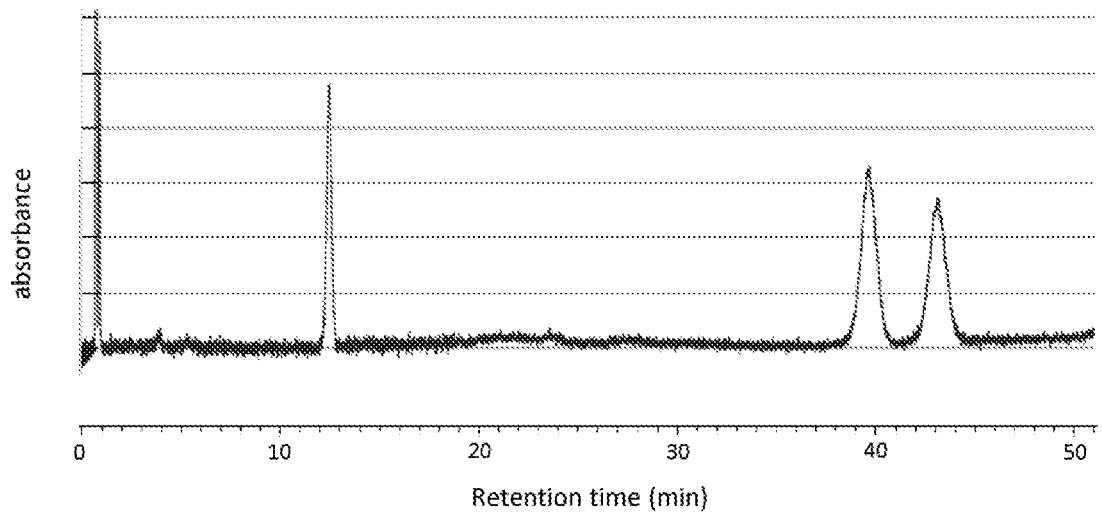
FIG. 1B is a diagrams illustrating results obtained by SFC, for separation of phenylphenols (ortho, meta and para mixture) using the stationary phase of Example 1, respectively.

FIG. 1A illustrates a chromatogram obtained by high performance liquid chromatography, and FIG. 1B illustrates a chromatogram obtained by SFC, for separation of phenylphenols (ortho, meta and para mixture) using the same stationary phase, respectively.

Conditions of high performance liquid chromatography: eluent (Hex/EtOH=97/3), flow rate: 1.0 mL/min, detection: UV 254 nm.

Supercritical fluid chromatography was carried out under conditions of eluent: $CO_2$/methanol (97:3 v/v), flow rate: 4 mL/min, temperature: 40° C., back pressure: 150 bar. Detection was performed UV 254 nm.

Separation Example 2

Figure 2A:
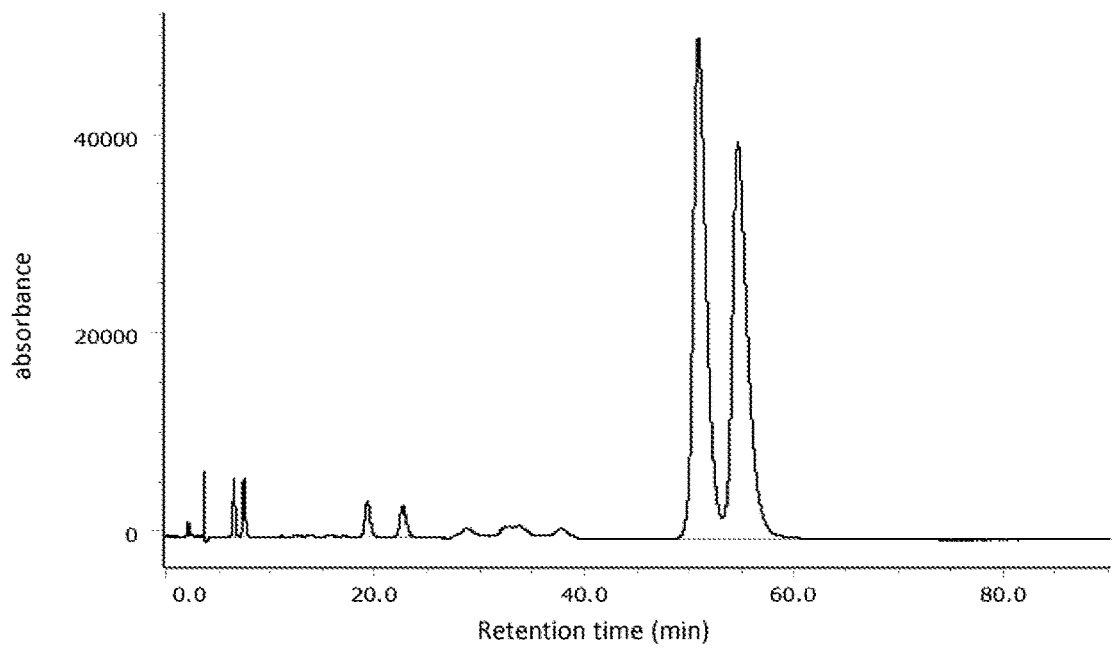
FIG. 2A is a diagram illustrating results obtained by HPLC.
Figure 2B:
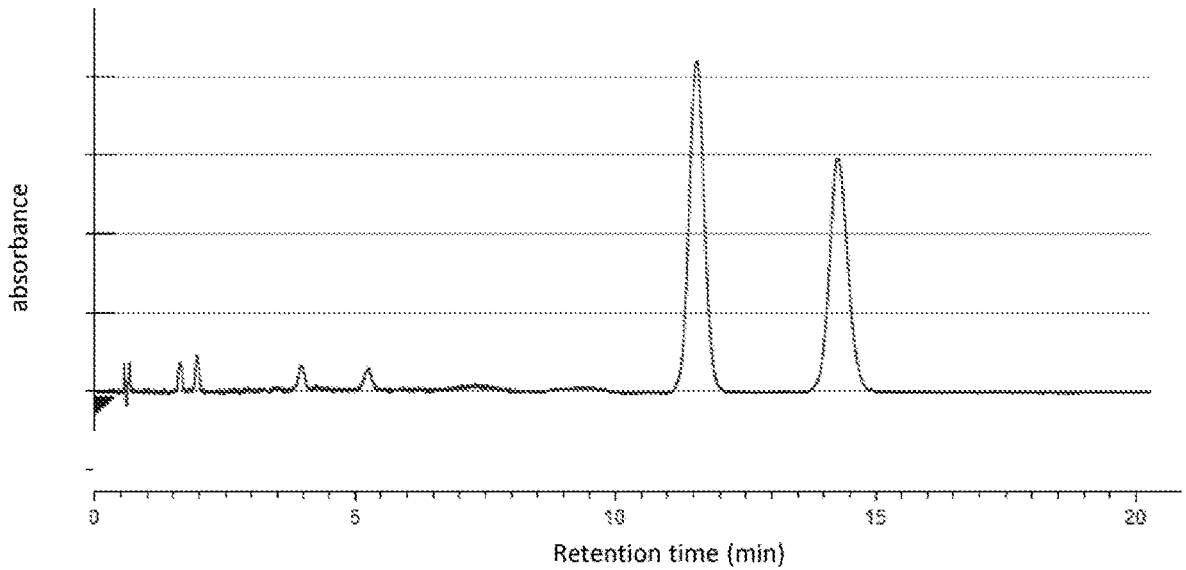
FIG. 2B is a diagram illustrating results obtained by SFC, for separation of hydrocortisone and prednisolone using the stationary phase of Example 1, respectively.
Figure 3A:
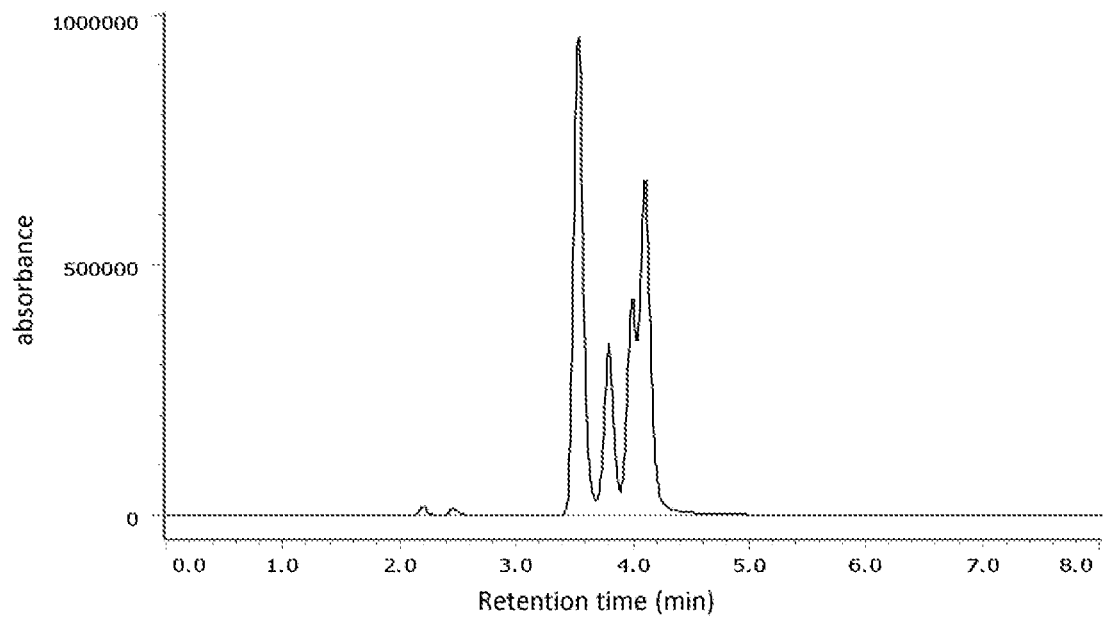
FIG. 3A is a diagram illustrating results obtained by HPLC.
Figure 3B:
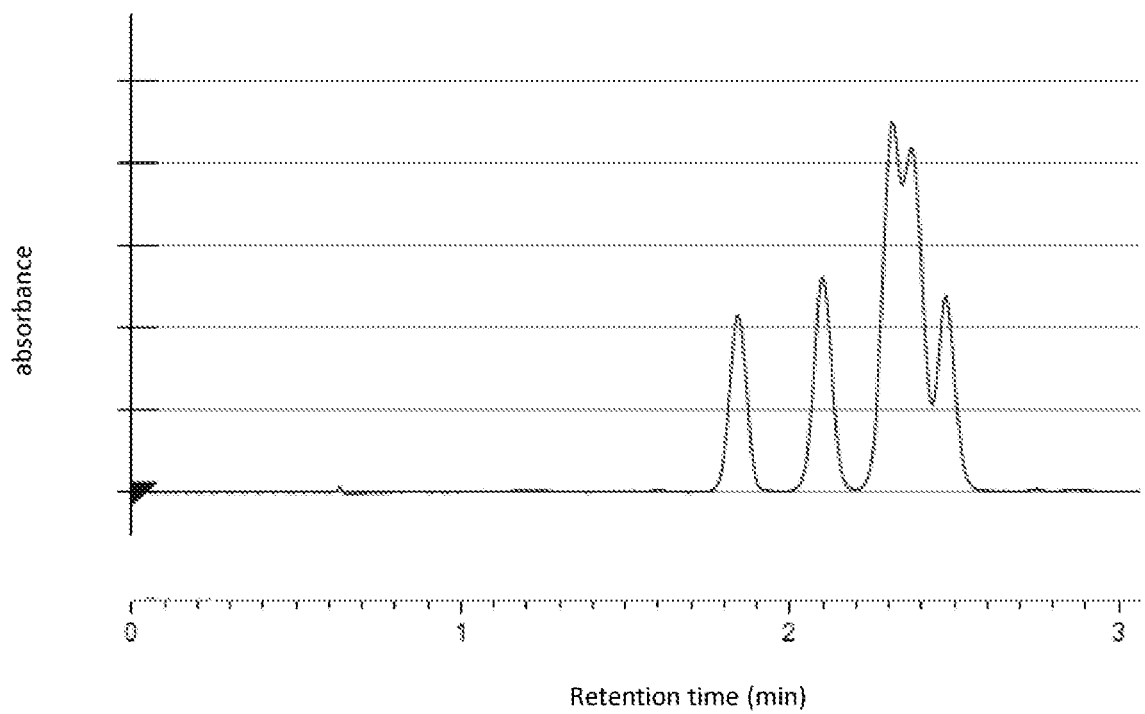
FIG. 3B is a diagram illustrating results obtained by SFC, for separation of three isomers of acetylphenanthrene and two isomers of acetylanthracene, using the stationary phase of Example 1, respectively.

FIGS. 2A and 3B are chromatograms obtained for separation of hydrocortisone and prednisolone using the same stationary phase as in Separation example 1, where FIG. 2A is a chromatogram obtained by HPLC and FIG. 2B is a chromatogram obtained by SFC.

Conditions were identical to those of Separation example 1, but herein HPLC involved eluent: $CO_2$/ethanol (90:10 v/v) and SFC involved eluent: $CO_2$/methanol (90:10 v/v).

Separation Example 3

FIGS. 3A and 3B are chromatograms obtained for separation of acetylphenanthrene and acetylanthracene using the same stationary phase as in Separation example 1, where FIG. 3A is a chromatogram obtained by HPLC and FIG. 3B is a chromatogram obtained by SFC.

The HPLC and SFC conditions were identical to those of Separation example 1.

Separation Example 4

Figure 4A:
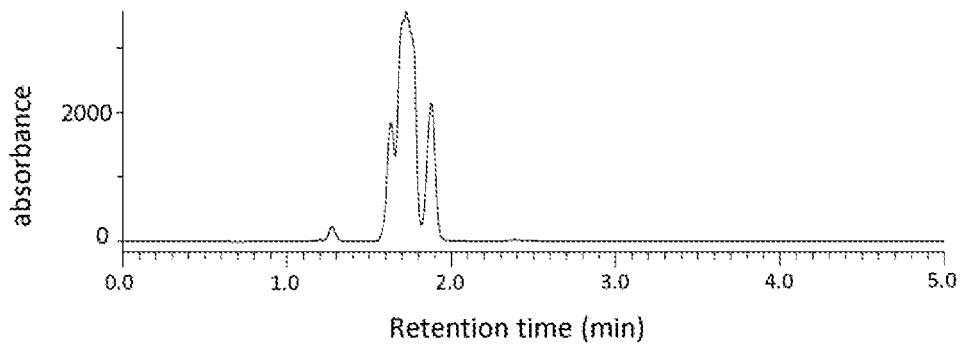
FIG. 4A is a diagram illustrating results obtained using a commercially available stationary phase.
Figure 4B:
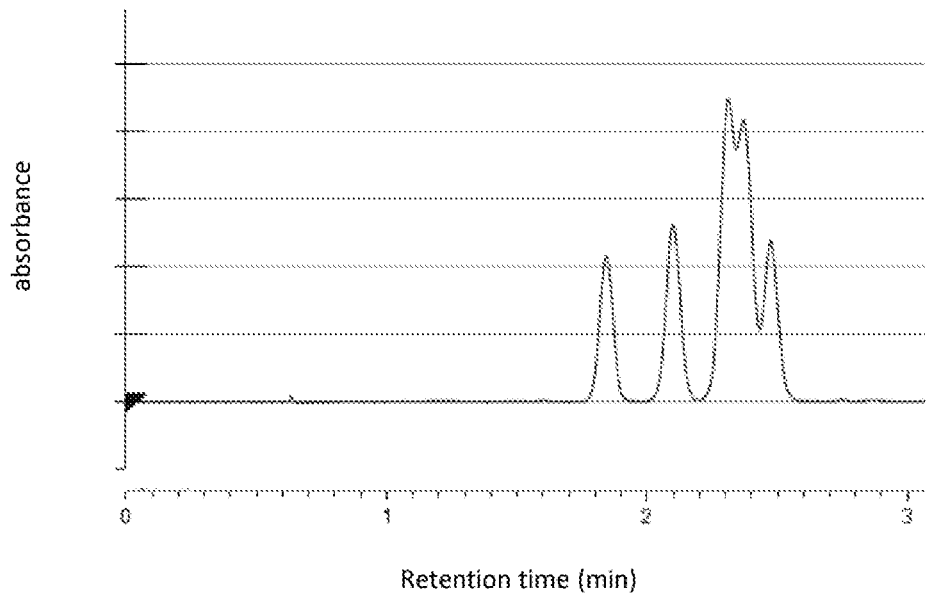
FIG. 4B is a diagram illustrating results obtained using the stationary phase of Example 1, for separation of acetylphenanthrene and acetylanthracene, respectively.

FIG. 4A illustrates a chromatogram obtained using a commercial 2-ethylpyridine-bonded silica gel, as a stationary phase, and FIG. 4B illustrates a chromatogram obtained using the stationary phase for SFC of Separation example 1, for separation of acetylphenanthrene and acetylanthracene.

The SFC conditions were identical to those of Separation example 1.

The structure of the commercial 2-pyridylethyl stationary phase (represented by the formula below) is as follows.

[C16]

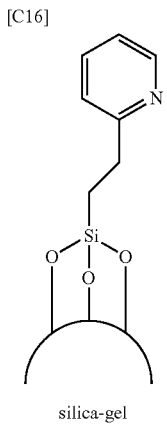

silica-gel

Separation Example 5

Figure 5A:
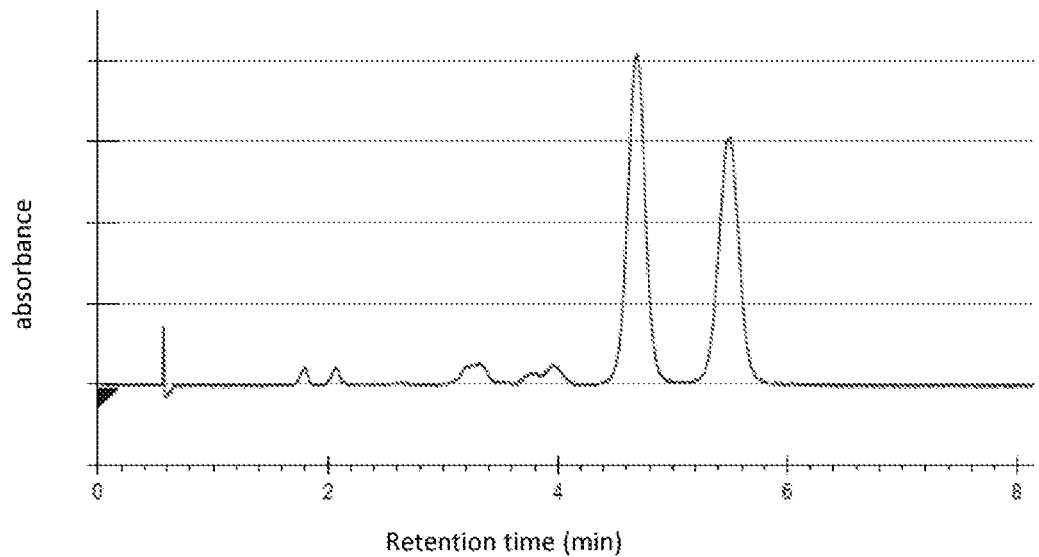
FIG. 5A is a diagram illustrating results obtained using a commercially available stationary phase.
Figure 5B:
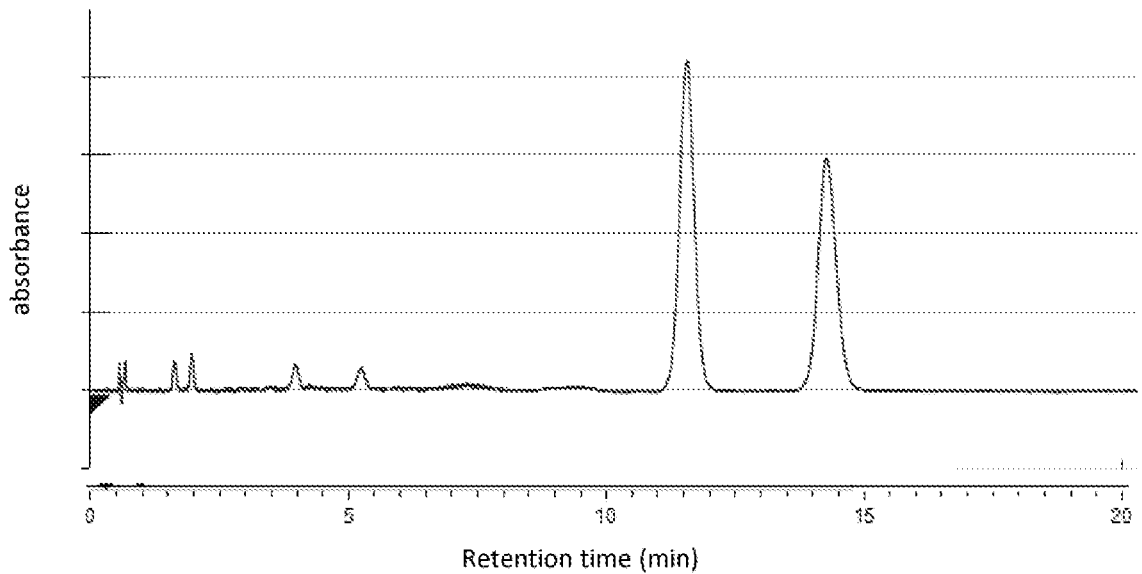
FIG. 5B is a diagram illustrating results obtained using the stationary phase of Example 1, for separation of hydrocortisone and prednisolone, respectively.

FIG. 5A illustrates a chromatogram obtained using 2-ethylpyridine-bonded silica gel (comparative example) utilized in Separation example 4, and FIG. 5B illustrates a chromatogram obtained using poly(1-vinyl-2-pyrrolidone)-bonded silica gel utilized for SFC in Separation example 1, for separation of hydrocortisone and prednisolone by SFC.

The SFC conditions were identical to those of Separation example 1, but herein there was used eluent: $CO_2$/methanol (90:10 v/v).

Separation Example 6

Figure 6A:
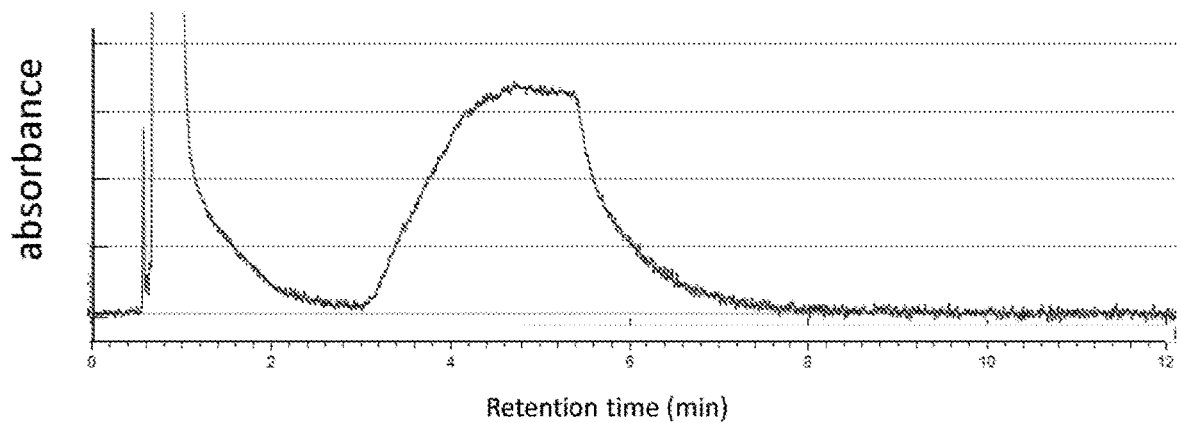
FIG. 6A is a diagram illustrating results obtained using the stationary phase of Example 4 (iniferter method)
Figure 6B:
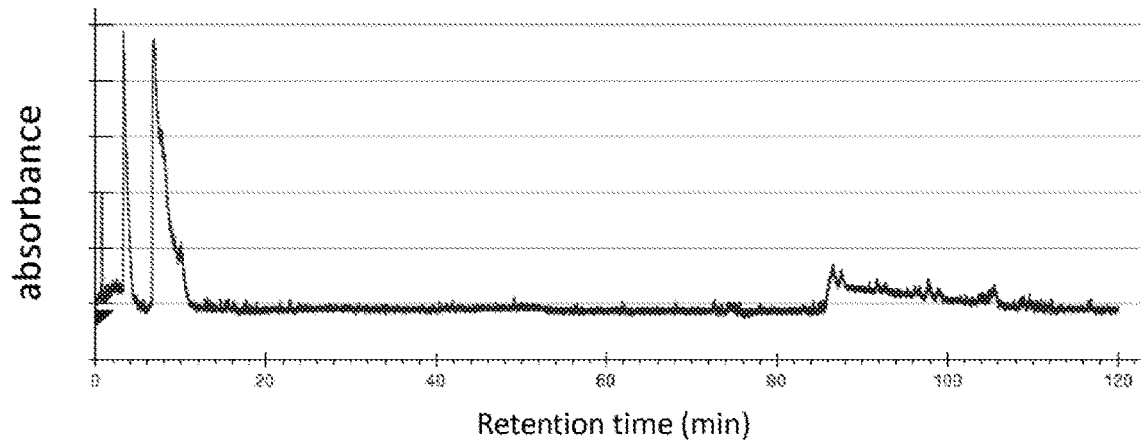
FIG. 6B is a diagram illustrating results obtained using the stationary phase of Example 5 (methacrylic ester copolymerization method)
Figure 6C:
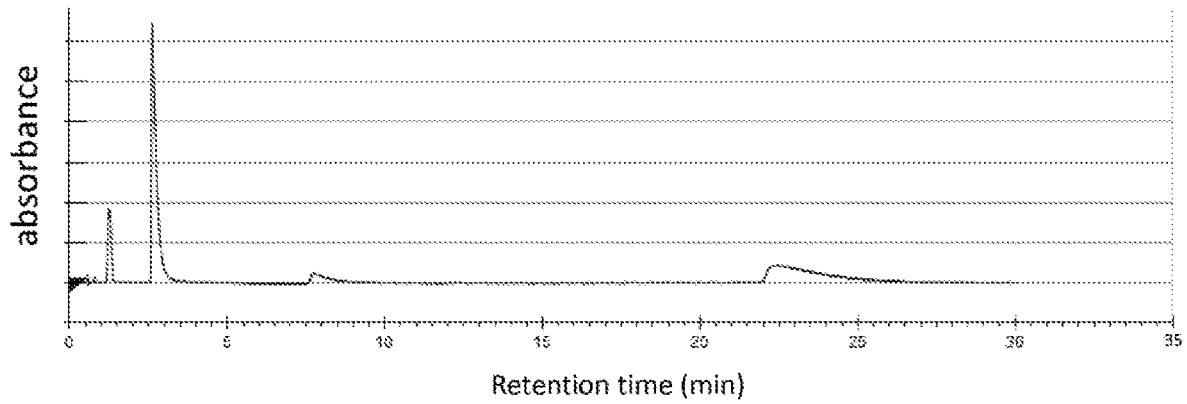
FIG. 6C is a diagram illustrating results obtained using the stationary phase of Example 1, for separation of four pharmaceuticals, namely alprenolol, propranolol, atenolol and pindolol, collectively referred to as beta-blockers, respectively.

FIG. 6A illustrates results obtained using the stationary phase of Example 4 (iniferter method), FIG. 6B illustrates results obtained using the stationary phase of Example 5 (methacrylic ester copolymerization method), and FIG. 6C illustrates results obtained using the stationary phase of Example 1, for separation of four pharmaceutical components (alprenolol, propranolol, atenolol and pindolol) referred to as beta-blockers. In diagrams of FIGS. 6B and 6C all components elute, but FIG. 6A shows only elution of alprenolol having been confirmed. The SFC condition in all the chromatography runs were identical to those of Separation example 1, but herein there was used eluent: $CO_2$/methanol (90:10 v/v).

A degree of separation (Rs) was calculated for all the peaks in FIG. 1, FIG. 2 and FIG. 5. The results are summarized in the table.

The degree of separation is given by the expression below.

Degree of separation(Rs): 2×(distance between peak of more strongly adsorbed separation target and peak of more weakly adsorbed separation target)/total band width between the two peaks

TABLE 1

| Figure number | Separation target | Stationary phase | Separation conditions | Degree of separation (Rs) |
|---|---|---|---|---|
| FIG. 1 | o-phenylphenol and m-phenylphenol | Example 1 | HPLC | 10.6 |
|  |  | Example 1 | SFC | 25.9 |
| FIG. 1 | m-phenylphenol and p-phenylphenol | Example 1 | HPLC | 1.35 |
|  |  | Example 1 | SFC | 2.11 |

TABLE 1-continued

| Figure number | Separation target | Stationary phase | Separation conditions | Degree of separation (Rs) |
|---|---|---|---|---|
| FIG. 2 | Prednisolone and hydrocortisone | Example 1 | HPLC | 1.5 |
|  |  | Example 1 | SFC | 4.4 |
| FIG. 5 | Prednisolone and hydrocortisone | Comparative Example | SFC | 2.7 |
|  |  | Example 1 | SFC | 4.4 |

The results of Table 1 reveal that the stationary phase of the present invention affords a higher degree of separation of target substances when used in SFC than in HPLC. It is further found that the stationary phase of the present invention exhibits characteristics different from those of 2-ethylpyridine stationary phases, which have been used most frequently in conventional art, and often afford better separation than a 2-ethylpyridine stationary phase, when both were are equally in SFC.

INDUSTRIAL APPLICABILITY

The stationary phase of the present invention has good separation characteristics also towards compounds that are difficult to separate by conventional HPLC. Specifically, the stationary phase of the present invention has prospects of affording improvements in number of column plates.

Accordingly, the stationary phase of the present invention is expected to contribute not only to developing and improving novel separation conditions of various substances that have been difficult to separate heretofore, but also to improve convenience in analysis and identification of separated substances.

The invention claimed is:

1. A stationary phase for supercritical fluid chromatography, comprising
a carrier and a polymer including a pyrrolidone backbone in repeating units of a main chain of the polymer, wherein a surface of the carrier is modified with the polymer; and
a structure represented by Formula (II):

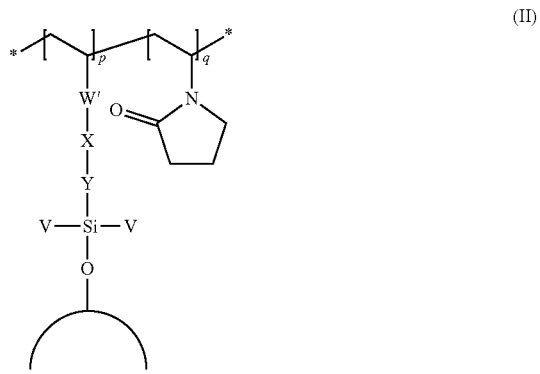

(II)

wherein W' is a single bond or an unbranched or branched alkylene group having carbon number of 1 to 10; X is an amide group or a N-alkylamide group having carbon number of 1 to 3; Y is an alkylene group having carbon number of 1 to 30; V is an ether group bonded to a carrier surface, an alkoxy group having carbon number of 1 to 5 or an alkyl group having carbon number of 1 to 3; p is 1 to 10; and q is 10 to 300.

2. The stationary phase for supercritical fluid chromatography according to claim 1, which is a spherical particle.

3. The stationary phase for supercritical fluid chromatography according to claim 1, wherein an average particle size is 0.1 μm to 1000 μm.

4. The stationary phase for supercritical fluid chromatography of claim 1, which is of monolithic form.

5. A method for separating a target substance, the method comprising a step of separating the target substance by using the stationary phase of claim 1, and a mobile phase containing a supercritical fluid.

\* \* \* \* \*